United States Patent
Noorkami et al.

(10) Patent No.: US 8,818,037 B2
(45) Date of Patent: Aug. 26, 2014

(54) VIDEO SCENE DETECTION

(71) Applicant: Microsoft Corporation, Redmond, WA (US)

(72) Inventors: Maneli Noorkami, San Francisco, CA (US); Yi Linda Chan, Mountain View, CA (US)

(73) Assignee: Microsoft Corporation, Redmond, WA (US)

(*) Notice: Subject to any disclaimer, the term of this patent is extended or adjusted under 35 U.S.C. 154(b) by 45 days.

(21) Appl. No.: 13/633,021

(22) Filed: Oct. 1, 2012

(65) Prior Publication Data

US 2014/0093164 A1 Apr. 3, 2014

(51) Int. Cl.
*G06K 9/00* (2006.01)

(52) U.S. Cl.
USPC ........... 382/103; 382/168; 382/171; 382/218; 382/219

(58) Field of Classification Search
USPC ............... 382/103, 165, 166, 173, 218, 219; 386/241; 348/700, E5.067, 699, 169; 707/706, 769, 720, 914, 729, 999.002; 375/240.16; 1/1; 715/723
See application file for complete search history.

(56) References Cited

U.S. PATENT DOCUMENTS

| | | | |
|---|---|---|---|
| 5,821,945 A | 10/1998 | Yeo et al. | |
| 6,466,731 B2* | 10/2002 | Aoki et al. | 386/241 |
| 6,606,409 B2 | 8/2003 | Warnick et al. | |
| 6,810,144 B2* | 10/2004 | McGee et al. | 382/166 |
| 7,356,082 B1* | 4/2008 | Kuhn | 375/240.16 |
| 8,364,660 B2* | 1/2013 | Delgo et al. | 707/706 |
| 8,364,698 B2* | 1/2013 | Delgo et al. | 707/769 |
| 2008/0232687 A1 | 9/2008 | Petersohn | |
| 2009/0086034 A1 | 4/2009 | Nakamura et al. | |
| 2009/0290791 A1 | 11/2009 | Holub et al. | |
| 2011/0041080 A1 | 2/2011 | Fleischman et al. | |

OTHER PUBLICATIONS

Godbole, Prajakta., "Comparison of video shot boundary detection techniques", Retrieved at <<http://www.public.asu.edu/~pgodbole/Video%20Shot%20Detection%20Report.doc>>, Nov. 27, 2006, pp. 3.

Abdeljaoued, et al., "A New Algorithm for Shot Boundary Detection", Retrieved at <<http://www.eurasip.org/Proceedings/Eusipco/Eusipco2000/SESSIONS/TUEAM/SS3/CR1575.PDF />>, In Proceeding of European Signal Processing Conference (EUSIPCO'2000), Sep. 5, 2000, pp. 4.

(Continued)

*Primary Examiner* — Anh Do
(74) *Attorney, Agent, or Firm* — Aaron Chatterjee; Andrew Sanders; Micky Minhas

(57) ABSTRACT

Systems and related methods for detecting a scene in video content are provided. In one example, a scene detection program identifies a plurality of shots in the video content and selects a target shot. The program builds a forward window including the target shot and having shots that are temporally ahead of the target shot, and a rearward window having shots that are temporally behind the target shot. For each of the shots in the forward window the program determines a dissimilarity between a selected shot in forward window and each of the other shots in the rearward window. If one or more of the dissimilarities is less than a scene boundary threshold, the program determines that the scene does not begin at the target shot. If none of the dissimilarities is less than the scene boundary threshold, the program determines that the scene begins at the target shot.

20 Claims, 6 Drawing Sheets

(56) References Cited

OTHER PUBLICATIONS

Lin, et al., "Automatic Video Scene Extraction by Shot Grouping", Retrieved at <<http://www.cis.pku.edu.cn/faculty/vision/lintong/ICPR00_lin.pdf>>, Proceedings: In the 15th International Conference on Pattern Recognition, 2000, pp. 4.

Zhao, et al., "Video Shot Grouping Using Best-First Model Merging", Retrieved at <<http://citeseerx.ist.psu.edu/viewdoc/download;jsessionid=2392582DE17E2B64928173575844076C?doi=10.1.1.16.1968&rep=rep1&type=pdf>>, Proceedings: In Proceeding of SPIE Conference on Storage and Retrieval for Media Databases, Jan. 2001, pp. 8.

Rasheed, et al., "Detection and Representation of Scenes in Videos", Retrieved at <<http://ieeexplore.ieee.org/stamp/stamp.jsp?tp=&arnumber=1542086>>, Proceedings: In Journal of IEEE Transactions on Multimedia, vol. 7, Issue 6, Dec. 2005, pp. 1097-1105.

Sakarya, et al., "Video Scene Detection Using Dominant Sets", Retrieved at <<http://ieeexplore.ieee.org/stamp/stamp.jsp?arnumber=04711694>>, Proceedings: In 15th IEEE International Conference on Image Processing, Oct. 12, 2008, pp. 4.

Qu, et al., "A Method of Shot Detection Based on Color and Edge Features", Retrieved at <<http://ieeexplore.ieee.org/stamp/stamp.jsp?tp=&arnumber=5271731>>, Proceedings: In 1st IEEE Symposium on Web Society, Aug. 23, 2009, pp. 4.

Hameed, Abdul., "A Novel Framework of Shot Boundary Detection for Uncompressed Videos", Retrieved at <<http://ieeexplore.ieee.org/stamp/stamp.jsp?arnumber=05353162>>, Proceedings: In International Conference on Emerging Technologies, Oct. 19, 2009, pp. 6.

Hong-Cai, et al., "A Shot Boundary Detection Method Based on Color Space", Retrieved at <<http://ieeexplore.ieee.org/stamp/stamp.jsp?tp=&arnumber=5592751>>, In Proceedings of the International Conference on E-Business and E-Government, May 7, 2010, pp. 4.

Li, et al., "Fast video Shot Boundary Detection Framework Employing Pre-Processing Techniques", Retrieved at <<http://ieeexplore.ieee.org/stamp/stamp.jsp?tp=&arnumber=5069969>>, Proceedings: In IET Image Processing, vol. 3, Issue 3, Jun. 2009, pp. 14.

Bescos, et al., "A Unified Model for Techniques on Video-Shot Transition Detection", Retrieved at <<http://ieeexplore.ieee.org/stamp/stamp.jsp?tp=&arnumber=1407902>>, Proceedings: In Transactions on Multimedia, vol. 7, Issue 2, Apr. 2005, pp. 293-307.

Kawai, Yoshihiko et al., "Shot Boundary Detection at TRECVID 2007." TRECVID 2007, Jan. 1, 2007, 8 pages.

Wang, Jihua et al., "Cinematic-Based Model for Scene Boundary Detection", The Eighth Conference on Multimedia Modeling, Nov. 5, 2001, 16 pages.

Yeo, Boon-Lock et al., "A Unified Approach to Temporal Segmentation of Motion JPEG and MPEG Compressed Video", Proceedings of the International Conference on Multimedia Computing and Systems, IEEE, May 15, 1995, 8 pages.

Aoki, Hisashi et al., "A Shot Classification Method of Selecting Effective Key-Frames for Video Browsing", Proceedings of the Fourth ACM International Conference on Multimedia, ACM, Nov. 18, 1996, 10 pages.

Yuan, Jinhui, et al. "A Formal Study of Shot Boundary Detection", Transactions on Circuits and Systems for Video Technology, IEEE, vol. 17, No. 2, Feb. 1, 2007, pp. 168-186.

European Patent Office, International Search Report and Written Opinion of PCT/US2013/058431, Nov. 19, 2013, Netherlands, 13 pages.

* cited by examiner

VIDEO SCENE DETECTION

BACKGROUND

In some forms of video content, the video may be composed of individual video frames that may be grouped into a number of shots. In some examples, a shot may be characterized as a sequence of frames that are captured with a certain visual angle of a camera. A scene may be characterized as a collection of shots that may be related in action, place, context, and/or time, with such relationship perhaps corresponding to the nature of the content or program. For example, in some examples of situation comedies, soap operas, and/or dramatic programs, a scene may be characterized as a continuous set of shots that capture a certain action taking place in a particular location.

While watching or browsing video content, a user may desire to access a particular scene or portion of the content related to a scene. One approach to locating scenes within video content may involve grouping individual frames into shots by detecting shot boundaries at shot transitions. Hard cut shot transitions, in which the first frame of an appearing shot immediately follows the last frame of a disappearing shot, may be located by detecting differences in consecutive frames. On the other hand, gradual shot transitions typically span multiple frames over which the disappearing shot gradually transitions to the appearing shot. Within a gradual shot transition, temporally adjacent frames may be a combination of the disappearing shot and the appearing shot. As such, a gradual shot transition may include smaller and nonlinear differences between consecutive frames, making it more challenging to accurately identify a shot boundary.

Once shots are identified, the shots may be clustered into scenes. Algorithms that use K-mean clustering to cluster shots into scenes are known. These algorithms, however, typically depend upon an estimation of the number of expected clusters. As such, these approaches are highly sensitive to a correct estimation of the number of expected clusters. The corresponding algorithms are also relatively complicated and computationally expensive. Furthermore, while the correlation among individual frames that constitute a shot may be fairly reliable, the correlation among shots that comprise a scene may be more unpredictable, and may depend on the angle of the camera, the nature of the scene, and/or other factors. Accordingly, it can prove challenging to reliably and repeatedly identify scenes.

SUMMARY

To address the above issues, a scene detection system and related method for detecting a scene in video content are provided. In one example, a scene detection system for detecting a scene in video content may comprise a computing device including a processor and memory. A scene detection program is executed by the processor using portions of the memory. The scene detection program may be configured to identify a plurality of shots in the video content. The scene detection program may select a target shot in the plurality of shots.

The scene detection program may then build a forward window including the target shot and having a first number of shots that are temporally ahead of the target shot, and a rearward window having a second number of shots that are temporally behind the target shot. For each of the shots in the forward window, the scene detection program may determine a dissimilarity between a selected shot and each of the other shots in the rearward window. If one of the determined dissimilarities is less than a scene boundary threshold, the scene detection program may determine that the scene does not begin at the target shot. If none of the determined dissimilarities is less than the scene boundary threshold, the scene detection program may determine that the scene begins at the target shot.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
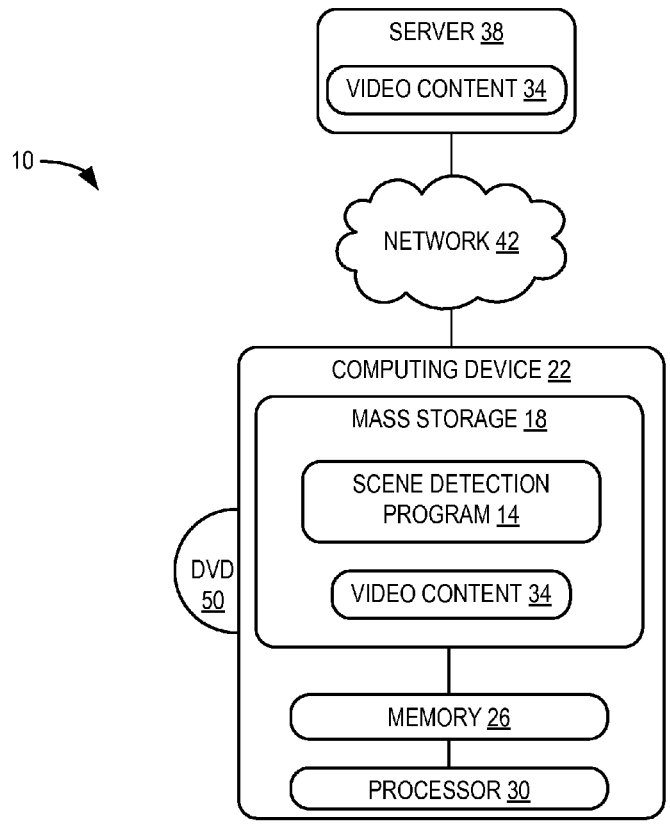
FIG. 1 is a schematic view of a scene detection system according to an embodiment of the present disclosure.

FIG. 1 shows a schematic view of one embodiment of a scene detection system 10 for detecting one or more scenes in video content. The scene detection system 10 includes a scene detection program 14 stored in mass storage 18 of a computing device 22. The scene detection program 14 may be loaded into memory 26 and executed by a processor 30 of the computing device 22 to perform one or more of the methods and processes described in more detail below.

Video content 34 may be stored in mass storage 18. In some examples, video content 34 may be received by the computing device 22 from removable computer-readable storage media 50, shown here in the form of a DVD. The removable computer-readable storage media 50 may be used to store and/or transfer data, including but not limited to the video content 34, scene detection program 14, and other media content and/or instructions executable to implement the methods and processes described herein. The removable computer-readable storage media 50 may also take the form of CDs, HD-DVDs, Blu-Ray Discs, EEPROMs, and/or floppy disks, among others. In other examples, the video content 34 may be received from and/or accessed at a remote source, such as server 38 via network 42. In some examples the remote source may take the form of a cloud-based service.

Computing device 22 may take the form of a desktop computer, laptop computer, tablet computing, mobile computer, networking computer, gaming console, set-top box (e.g. cable television box, satellite television box) or any other type of suitable computing device. Additional details regarding the components and computing aspects of the computing device 22 are described in more detail below with respect to FIG. 8.

The computing device 22 also may be operatively connected with one or more additional devices, such as server 38 via network 42. Network 42 may take the form of a local area network (LAN), wide area network (WAN), wired network, wireless network, personal area network, or a combination thereof, and may include the Internet.

Figure 2:
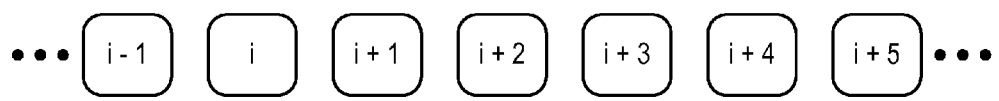
FIG. 2 is a schematic illustration of a series of consecutive video frames.

With reference now to FIG. 2, a schematic diagram of several individual frames (i−1), (i), (i+1), (i+2), etc., from video content 34 is provided. In this example, frame (i−1) is the frame temporally adjacent and behind frame (i), frame (i+1) is the frame temporally adjacent and ahead of frame (i), frame (i+2) is the frame temporally adjacent and ahead of frame (i+1), etc. It will be appreciated that each of the frames (i−1), (i), (i+1), (i+2), etc. may represent an image captured by an image capture device, such as a video camera, or an image generated by a computing device.

As noted above, a shot may be characterized as a continuous sequence of frames that are captured with a common visual angle of a camera. Accordingly, the frames constituting a shot may be visually correlated. It will also be appreciated that detecting a shot boundary at a transition between a first shot and a temporally adjacent second shot may be useful for performing higher-level video segmentation, such as scene detection.

Figure 3:
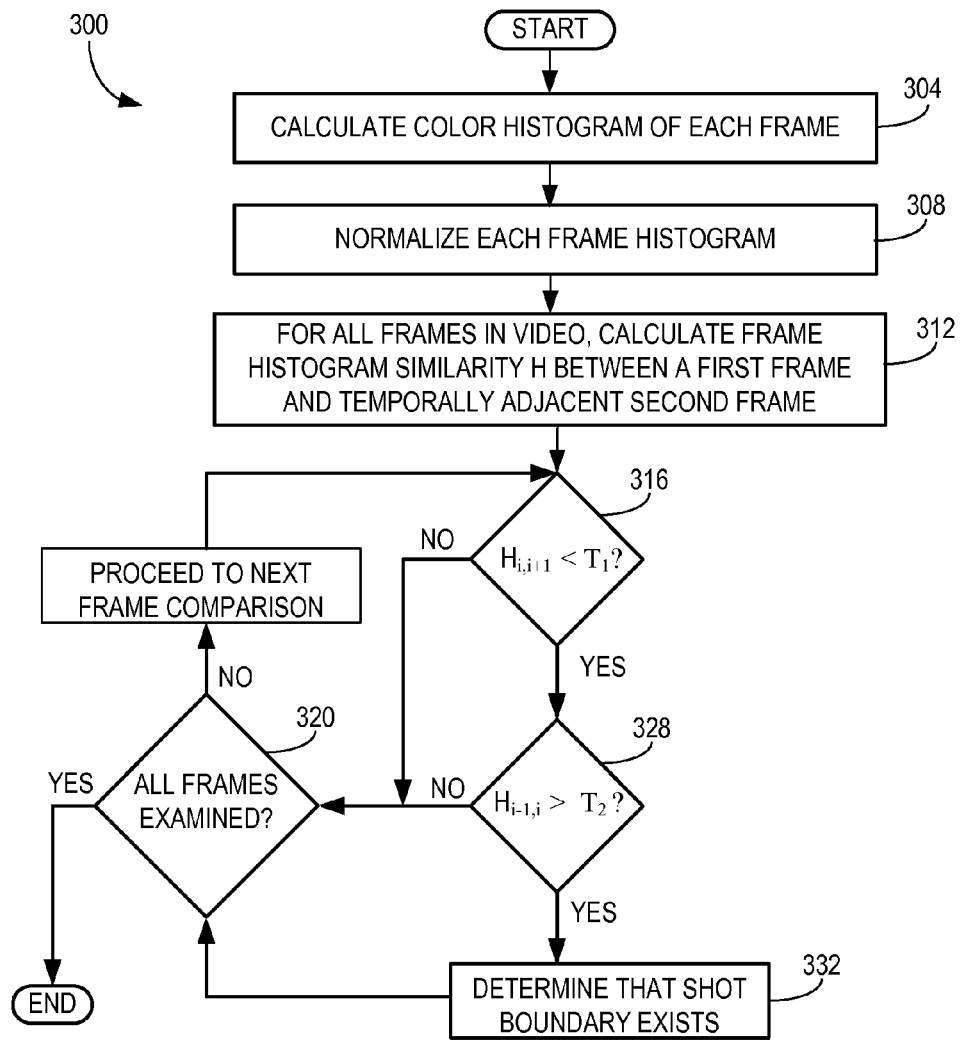
FIG. 3 is a flow chart of a method for detecting a hard cut shot transition according to an embodiment of the present disclosure.

Also as noted above, different shot transition techniques may be utilized to transition from one shot to another shot. One example of a shot transition is a hard cut transition, in which the first frame of the appearing shot immediately follows the last frame of the disappearing shot. With reference now to FIG. 3, an embodiment of a method 300 for analyzing each frame of a plurality of frames in the video content 34 to identify one or more hard cut transitions is provided. The following description of method 300 is provided with reference to the software and hardware components of the scene detection system 10 described above and shown in FIG. 1. It will be appreciated that method 300 may also be performed in other contexts using other suitable hardware and software components.

With reference to FIG. 3, at 304 the method 300 may include calculating a color histogram of each frame (i) in the video content 34. In one example utilizing an RGB color space, the red, green, and blue pixel values of a frame are converted to the YCbCr color space. A YCbCr color histogram of each frame (i) is then calculated using a number B of bins. In one example, the number B of bins may be 16. In other examples, the number B of bins may be 4, 8, 12, 20, 32, 64, 128 or other suitable number of bins. At 308 the method 300 may include normalizing each frame histogram by dividing the value in each bin by the number of pixels of the frame being analyzed.

At 312 the method 300 may include, for all frames in the video content 34, calculating a frame histogram similarity H between a first frame and a temporally adjacent second frame. In one example, the color histogram similarity between a first frame (i) and a temporally adjacent frame (i+1) may be calculated as follows:

$$H_{i,i+1} = \sum_{b=1}^{B} \min(H_i^Y(b), H_{i+1}^Y(b)) + \min(H_i^{Cb}(b), H_{i+1}^{Cb}(b)) + \min(H_i^{Cr}(b), H_{i+1}^{Cr}(b))$$

where $H_i^Y(b)$ is the ratio of the number of pixels whose Y value falls in bin b to the total number of pixels in frame (i). To determine whether a shot boundary exists at frame (i) (i.e., whether a hard cut transition exists between frame (i)−1 and frame (i)), at 316 the method 300 may include determining whether the following first condition is satisfied:

$$H_{i,i+1} < T_1$$

where $T_1$ is a first histogram similarity threshold value. In one example, $T_1$ may be approximately 2.85. In other examples, $T_1$ may be 2.25, 2.45, 2.65, 3.05, 3.25, 3.45 or other suitable threshold value.

If $H_{i,i+1} \geq T_1$, then at 320 the method 300 may include determining whether all of the frames in the video content 34 have been examined to identify a hard cut transition. If all of the frames in the video content 34 have been examined, then the method 300 may end. If all of the frames of the video content 34 have not been examined to identify a hard cut transition, then the method 300 may proceed to the next frame comparison.

Returning to 316, if $H_{i,i+1} < T_1$ then at 328 the method 300 may include determining whether the following second condition is satisfied:

$$H_{i-1,i} > T_2$$

where $T_2$ is a second histogram similarity threshold value. In one example, $T_2$ may be approximately 2.9. In other examples, $T_2$ may be 2.3, 2.5, 2.7, 3.1, 3.3, 3.5 or other suitable threshold value.

If $H_{i-1,i} \leq T_2$, then at 320 the method 300 may include determining whether all of the frames in the video content 34 have been examined to identify a hard cut transition. If all of the frames in the video content 34 have been examined, then the method 300 may end. If all of the frames of the video content 34 have not been examined to identify a hard cut transition, then the method 300 may proceed to the next frame comparison.

Returning to 328, if $H_{i-1,i} > T_2$ then at 332 the method 300 may determine that a shot boundary exists at frame (i). Alternatively expressed, the method 300 may use a frame histogram similarity to identify a hard cut transition between the frame (i) and the temporally adjacent frame (i+1).

It will be appreciated that the first condition described above may identify a hard cut transition at frame (i) when the similarity between frame (i) and the temporally adjacent frame (i+1) is less than the first histogram similarity threshold value $T_1$. It will also be appreciated that the second condition described above may be utilized to rule out a fast camera movement condition which may cause a large difference between temporally adjacent frames (i−1) and (i) and result in $H_{i-1,i} < T_2$, and also a large difference between temporally adjacent frames (i) and (i+1) and result in $H_{i,i+1} < T_1$.

Another example of a shot transition is a gradual shot transition, in which two shots are concatenated and transitioned in a gradual fashion over multiple frames. Examples of gradual shot transitions include, but are not limited to, dissolving from one shot to another shot, fading from one shot to another shot, and wiping from one shot to another shot.

Figure 4:
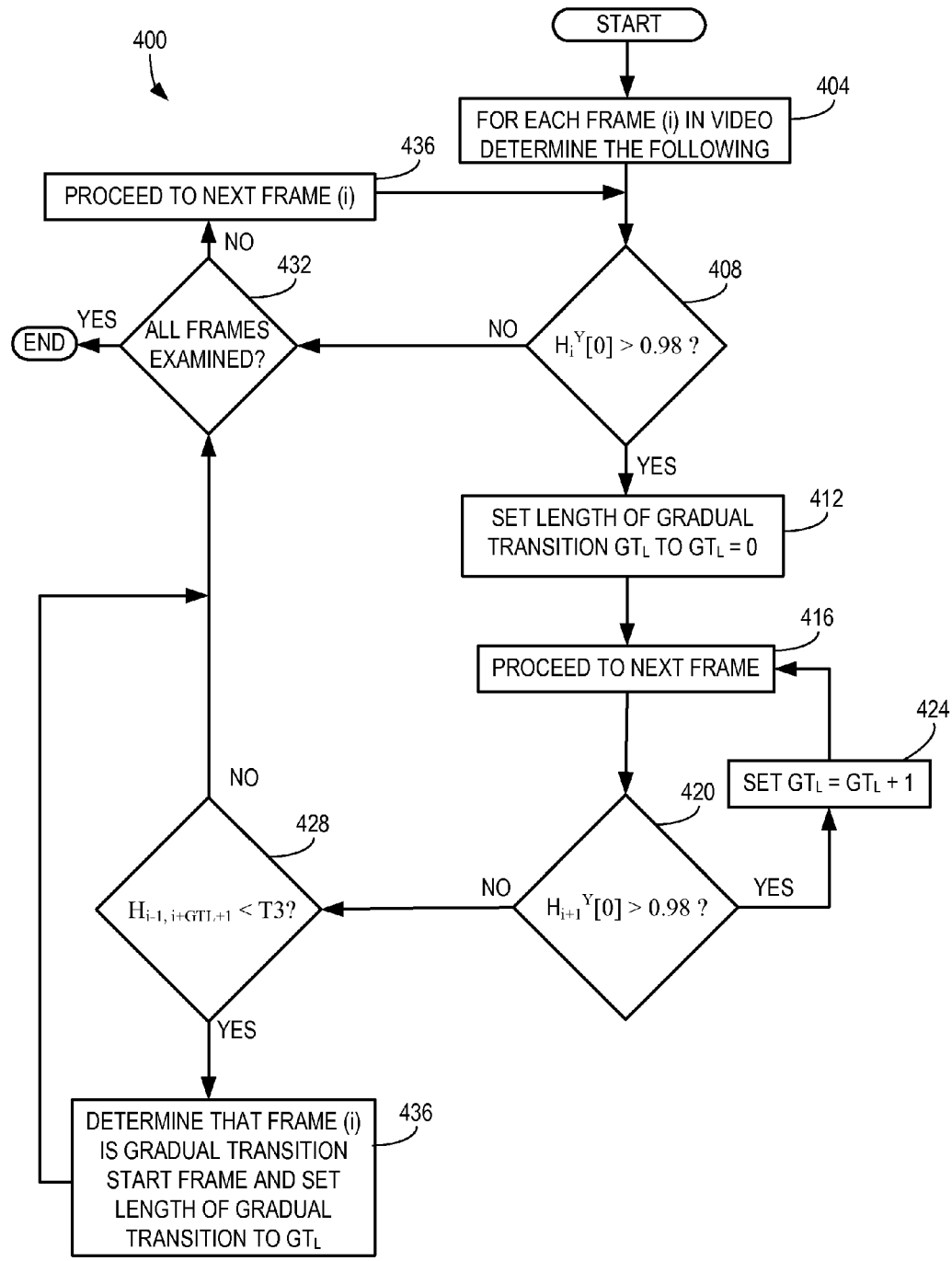
FIG. 4 is a flow chart of a method for detecting a first category of gradual shot transitions according to an embodiment of the present disclosure.
Figure 5:
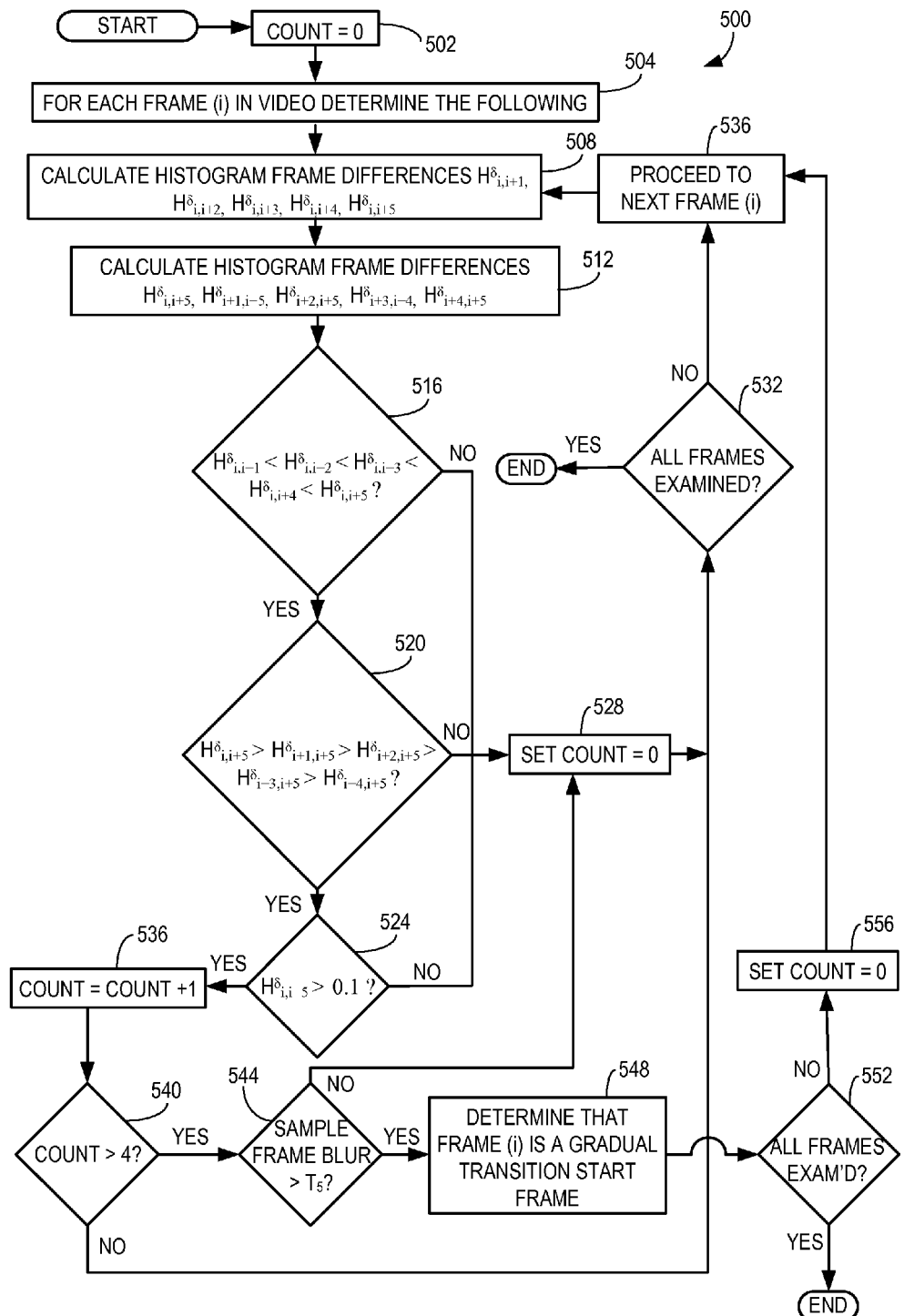
FIG. 5 is a flow chart of a method for detecting a second category of gradual shot transitions that may be not detected by the method shown in FIG. 4, according to an embodiment of the present disclosure.

With reference now to FIGS. 4 and 5, embodiments of methods 400 and 500 for identifying a gradual shot transition and gradual transition start frame are provided. The following description of methods 400 and 500 is provided with reference to the software and hardware components of the scene detection system 10 described above and shown in FIG. 1. It will be appreciated that methods 400 and 500 may also be performed in other contexts using other suitable hardware and software components.

As described in more detail below, in some embodiments the methods 400 and 500 for identifying a gradual shot transition may utilize the same frame histogram data that is calculated and utilized in the method 300 for identifying hard cut transitions as described above. Advantageously, by utilizing the same frame histogram data in this manner, such frame histogram data may be computed only once. Accordingly, the methods 400 and 500 for identifying a gradual shot transition described below may add only minor additional computational complexity to the systems and methods for detecting a scene in video content as described herein.

As described in more detail below, in some examples the method 400 may be used to identify gradual shot transitions to black (a first category). In this category of transitions, frames of a first shot transition to black with the last frame of the first shot being followed by the first frame of second shot. In other examples, the method 500 may be used to identify gradual shot transitions in which the last frame of a first shot transitions directly to the first frame of a second shot (a second category).

It will be appreciated that in some examples, the first category of gradual shot transitions may be easier to detect, and may have a longer length, as compared the second category of gradual shot transitions. Thus, in some examples, by detecting the first category of gradual transitions separately from the second category, the methods 400 and 500 may achieve improved results in detecting the second category of gradual transitions, including a better estimation of the gradual transition length.

With reference now to FIG. 4, an example method 400 of identifying a gradual shot transition of the first category described above will now be described. At 404 the method 400 may include, for each frame (i) in the video (the target frame), determining a cardinality of a first bin of a normalized Y component color histogram of the target frame (i). More particularly, at 408 and with respect to the target frame (i), the method 400 may include determining if the luma value Y of more than 98% of the total frame pixels is in the first bin of the histogram. It will be appreciated that pixels in the first bin of the histogram, i.e. having luma values Y zero or close to zero, are black or nearly black. Such a determination may be represented by:

$$H_i^Y[0]>0.98$$

If $H_i^Y[0]>0.98$, then at 412 the method 400 may set the length of a gradual transition $GT_L$ to $GT_L=0$. At 416 the method 400 may proceed to the next frame after target frame (i). At 420 the method 400 may make a similar determination of the cardinality of the first bin of the normalized Y component color histogram of next frame (i+1). If $H_{i+1}^Y[0]>0.98$, then at 424 the method 400 may set $GT_L$ to $GT_L+1$. At 416 the method 400 may proceed to the next frame (i+2) and make a similar determination of the cardinality of the first bin of the normalized Y component color histogram of next frame (i+2).

The method 400 may continue to cycle through 420, 424, and 416 until, at 420 the cardinality of the first bin of the normalized Y component color histogram for the current frame is ≤0.98. Upon this occurrence, at 428 the method 400 may determine if a frame histogram similarity between a temporally adjacent previous frame (i−1) and a temporally forward frame (i+$GT_L$+1) is less than a false positive similarity threshold T3. In one example, T3 may be 2.9 or the same value as the second histogram similarity threshold value T2. This determination may be represented by:

$$H_{i-1,i+GTL+1}<T3$$

If $H_{i-1,i+GTL+1} \geq T3$, then at 432 the method 400 may include determining whether all of the frames in the video content have been examined. If all of the frames in the video content have been examined, then the method 400 may end. If all of the frames of the video content have not been examined, then at 436 the method 400 may proceed to the next frame comparison.

Returning to 428, if $H_{i-1,i+GTL+1}<T3$, then at 436 the method 400 may include determining that the target frame (i) is a gradual transition start frame, and setting the length of the gradual transition to $GT_L$. At 432 the method 400 may then include determining whether all of the frames in the video content have been examined.

With reference now to FIG. 5, an example method 500 of identifying a gradual shot transition of the second category described above will now be described. At 502 the method 500 may include initializing a count to 0. At 504 the method 500 may include, for each frame (i) in the video (the target frame), calculating a number of histogram frame differences between the target frame (i) and consecutive following frames. More particularly, at 508 and with respect to the target frame (i), the method 500 may include calculating a first set of frame histogram differences between the target frame (i) and each of X consecutive following frames ending in an end frame (i+X), where X is a positive integer. In the example discussed below, X=5. It will be appreciated that other integer values of X may also be utilized. Where X=5, the first set of frame histogram differences may include:

$$H^\delta_{i,i+1}, H^\delta_{i,i+2}, H^\delta_{i,i+3}, H^\delta_{i,i+4}, H^\delta_{i,i+5}$$

At 512 the method 500 may include calculating a second set of frame histogram differences between the end frame (i+X) and the target frame (i) and between the end frame (i+X) and each of the consecutive following frames between the target frame and the end frame (i+X).

Where X=5, the second set of frame histogram differences may include:

$$H^\delta_{i,i+5}, H^\delta_{i+1,i+5}, H^\delta_{i+2,i+5}, H^\delta_{i+3,i+4}, H^\delta_{i+4,i+5}$$

In one example, to calculate the above frame histogram differences, the Euclidian distance between the color histogram of two frames (i), (j) may be used as follows:

$$H^\delta_{i,j} = \left[\sum_{b=1}^{B}(H_i^Y(b)-H_j^Y(b))^2 + (H_i^{Cb}(b)-H_j^{Cb}(b))^2 + (H_i^{Cr}(b)-H_j^{Cr}(b))^2\right]^{1/2}$$

At 516 the method 500 may include determining whether the frame histogram differences in the first set are increasing towards the end frame (i+5). In one example, this determination may be expressed as follows:

$$H^\delta_{i,i+1}, H^\delta_{i,i+2}, H^\delta_{i,i+3}, H^\delta_{i,i+4}, H^\delta_{i,i+5}$$

At 520 the method 500 may include determining whether the frame histogram differences in the second set are decreasing towards the end frame (i+5). In one example, this determination may be expressed as follows:

$$H^\delta_{i,i+5}, H^\delta_{i+1,i+5}, H^\delta_{i+2,i+5}, H^\delta_{i+3,i+5}, H^\delta_{i+4,i+5}$$

At 524 the method 500 may include determining whether a false positive frame histogram difference between the target frame (i) and the end frame (i+5) is greater than a false positive difference threshold $T_4$. In one example, this determination may be expressed as follows:

$$H^\delta_{i,i+5} > T_4$$

In one example $T_4=0.1$. It will be appreciated that other suitable examples of $T_4$ may also be utilized.

If any of the determinations at 516, 520 or 524 are NO, then at 528 the method 500 may include setting the count to 0. At 532 the method 500 may next include determining whether all of the frames in the video content have been examined. If all of the frames in the video content have been examined, then the method 500 may end. If all of the frames of the video content have not been examined, then at 536 the method 500 may proceed to the next frame.

Returning to the determinations at 516, 520 and 524, if all of these determinations are YES, then at 536 the method 500 may include setting the count to equal count+1. At 540 the method 500 may include determining whether count>Y, where Y is a positive integer. In this example, Y=4. It will be appreciated that other suitable integer values for Y may also be used.

If count≤4, then at 532 the method 500 may determine whether all of the frames in the video content have been examined. If all of the frames in the video content have been examined, then the method 500 may end. If all of the frames of the video content have not been examined, then at 536 the method 500 may proceed to the next frame.

Returning to 540, if the count>4 then at 544 the method 500 may include determining if a blur value of a sample frame taken from any of the frames (i), (i+1), (i+2), (i+3), (i+4) and (i+5) is greater than a blur value threshold $T_5$. In some examples, this determination may be used to identify certain false positives, such as a moving camera, that may be mistaken for a gradual transition. It will be appreciated that this determination may detect an amount of blur or sharpness at the edge frames (i) and (i+5). In some examples, frames in a moving camera sequence have sharper qualities, while frames in a gradual transition include greater blur. It will also be appreciated that any suitable blur value associated with a corresponding blurring technique may be utilized.

At 544, if the sample frame blur≤$T_5$ then the method 500 may proceed to 528, set the count=0 and continue to 532. If the sample frame blur>$T_5$ then at 548 the method 500 may determine that the target frame (i) is a gradual transition start frame. The method 500 may then proceed to 552 to determine whether all of the frames in the video content have been examined. If all of the frames in the video content have been examined, then the method 500 may end. If all of the frames of the video content have not been examined, then at 556 the method 500 may set the count to 0, and at 536 the method may proceed to the next frame.

Figure 6:
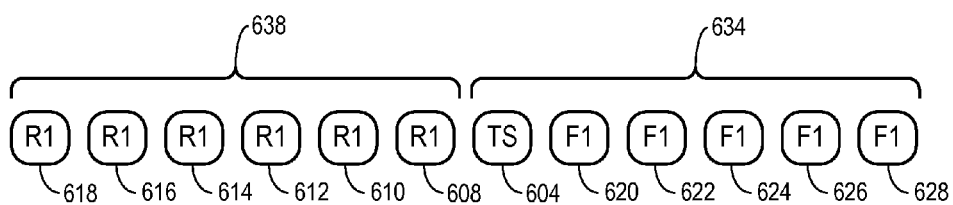
FIG. 6 is a schematic illustration of a series of consecutive shots including a target shot, a temporally forward window of shots and a temporally rearward window of shots.

With reference now to FIG. 6, as noted above a scene may be characterized as a set of temporally adjacent shots in the video content 34. FIG. 6 schematically illustrates a series of temporally adjacent shots that are temporally rearward and temporally forward of a target shot 604. More specifically, in this example six shots 608, 610, 612, 614, 616, and 618 that are temporally rearward of the target shot 604 are shown. Five shots 620, 622, 624, 626, and 628 that are temporally forward of the target shot 604 are shown.

Figure 7:
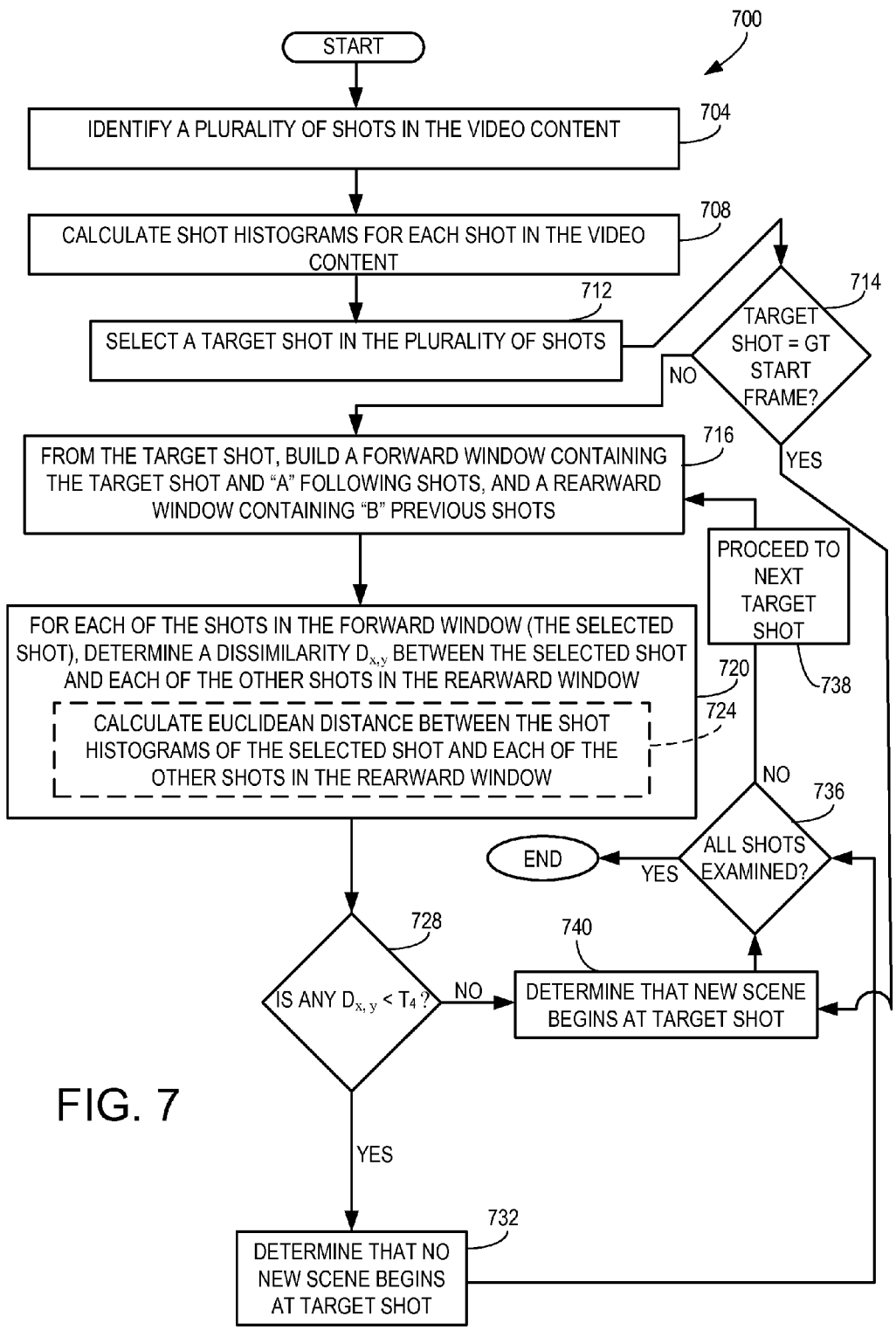
FIG. 7 is a flow chart of a method for detecting a scene according to an embodiment of the present disclosure.

With reference now to FIG. 7, an embodiment of a method 700 for detecting a scene in video content is provided. The following description of method 700 is provided with reference to the software and hardware components of the scene detection system 10 described above and shown in FIG. 1. It will be appreciated that method 700 may also be performed in other contexts using other suitable hardware and software components.

At 704 the method 700 may include identifying a plurality of shots in the video content 34. To identify the plurality of shots and as described above, the method 700 may include analyzing each frame of a plurality of frames in the video content 34 to identify the plurality of shots. In one example, the method 700 may include identifying a shot boundary by identifying a hard cut transition between a first frame and a second as described above with respect to the method 300. The method 700 may also include identifying one or more gradual transition start frames in the plurality of frames, indicating the beginning of a gradual transition shot boundary, as described above with respect to method 400. It will also be appreciated that the method 700 may utilize other methods and techniques for identifying a plurality of shots, identifying hard cut transitions and/or identifying gradual shot transitions.

At 708 the method 700 may include calculating color shot histograms for each shot in the video content 34. In one example, the color shot histograms for each shot may be calculated as follows:

$$H_x^Y(b) = 1/L \sum_{k=i}^{i+L} H_k^Y(b)$$

$$H_x^{Cb}(b) = 1/L \sum_{k=i}^{i+L} H_k^{Cb}(b)$$

$$H_x^{Cr}(b) = 1/L \sum_{k=i}^{i+L} H_k^{Cr}(b)$$

where i is the first frame of shot x, and L is the number of frames in shot x. Alternatively, the frame histogram of one representative frame in the shot can be used as the color histogram of the shot. In one example, the individual frame histograms for each frame in the video content 34 may have already been computed in identifying the plurality of shots via identifying hard cut transitions and/or gradual shot transitions as described above. Advantageously, the same frame histograms may be utilized to calculate the shot histograms. Accordingly, by making use of this pre-calculated frame histogram data, the method 700 for detecting a scene in video content may utilize minimal additional computational resources.

At 712 the method 700 may include selecting a target shot in the plurality of shots. At 714 the method 700 may determine if the target shot includes a gradual transition start frame. If the target shot does not include a gradual transition start frame, then at 716 the method 700 may include, beginning with the target shot, building a forward window including the target shot and containing a first number A of following shots that are temporally ahead of the target shot, and building a rearward window containing a second number B of previous shots that are temporally behind the target shot. With reference to FIG. 6 and target shot 604, in one example the forward window 634 may contain a total of 6 shots including the target shot 604 and 5 following shots 620, 622, 624, 626, and 628 (A=5). A rearward window 638 may also contain a total of 6 previous shots 608, 610, 612, 614, 616 and 618 (B=6).

It will be appreciated that in other examples, the forward window and rearward window may have a different number of shots such as 5, 6, 7, 8, 10, or other suitable number of shots. Additionally, the total number of shots in the forward window may be different than the total number of shots in the rearward window.

It will also be appreciated that the number of shots in the forward and rearward window may be selected to be large enough to capture one scene boundary defining two separate scenes. The number of shots in the forward and rearward window may also be selected to be small enough to avoid capturing two scene boundaries defining three separate scenes. In some examples, factors and/or characteristics of the type of video content 34 may be utilized to select the number of shots in the forward and rearward windows. For example, video content comprising a television soap opera program may utilize a different number of shots in the forward and rearward windows than video content comprising a television sitcom program.

At 720 the method 700 may include, for each of the shots in the forward window, determining a dissimilarity $D_{x,y}$ between a selected shot and each of the other shots in the rearward window. For example and with reference to FIG. 6, the selected shot may be shot 620 in the forward window. Shot 620 may be compared to the other 6 shots in the rearward window. Each such comparison may yield a dissimilarity $D_{x,y}$ between shot 620 and the other shot in the comparison. Next, shot 622 may be compared to the other 6 shots in the rearward window, and so forth until each of the 6 shots in the forward window has been compared to each of the 6 shots in the rearward window.

In one example, at 724 the method 700 may include determining a dissimilarity $D_{x,y}$ between a selected shot in the forward window and each of the other shots in the rearward window by calculating a Euclidean distance between the shot histograms of the selected shot and each of the other shots. The Euclidean distance between shot histograms of two shots x and y may be calculated as follows:

$$D_{x,y} = \left[ \sum_{b=1}^{B} (H_x^Y(b) - H_y^Y(b))^2 + (H_x^{Cb}(b) - H_y^{Cb}(b))^2 + (H_x^{Cr}(b) - H_y^{Cr}(b))^2 \right]^{1/2}$$

where B is the number of bins of the histogram.

At 728 the method 700 may include determining whether any of the determined dissimilarities Dx,y are less than a scene boundary threshold $T_4$. In some examples, $T_4$ may be approximately 1, 1.1, 1.2, 1.3, or 1.75. It will be appreciated that other suitable values of $T_4$ may also be utilized.

If one or more of the determined dissimilarities Dx,y is less than the scene boundary threshold $T_4$, then at 732 the method 700 may include determining that no new scene begins at the target shot 620. At 736 the method 700 may then determine whether all of the shots in the video content 34 have been examined. If all of the shots in the video content 34 have been examined, then the method 700 may end. If all of the shots of the video content 34 have not been examined, then at 738 the method 700 may proceed to the next target shot comparison.

Returning to 728, if none of the determined dissimilarities Dx,y are less than the scene boundary threshold $T_4$, then at 740 the method 700 may include determining that a new scene begins at the target shot 620. In one example, the method 700 may then insert metadata into the video content indicating that a new scene begins at the target shot 620.

At 736 the method 700 may then determine whether all of the shots in the video content 34 have been examined. If all of the shots in the video content 34 have been examined, then the method 700 may end. If all of the shots of the video content 34 have not been examined, then the method 700 may proceed to the next target shot comparison. In this manner, the method 700 may examine all of the shots in the video content 34 and efficiently determine one or more scene boundaries at one or more target shots, where a new scene begins at each scene boundary.

Returning to 714, if the target shot includes a gradual transition start frame, then at 740 the method 700 may include determining that a new scene begins at the target shot 620. In one example, the method 700 may then insert metadata into the video content indicating that a new scene begins at the target shot 620. The method 700 may then proceed to 736 to determine whether all of the shots in the video content 34 have been examined, and continue as described above.

In some embodiments, the methods and processes described above may be tied to a computing system of one or more computing devices. In particular, such methods and processes may be implemented as a computer-application program or service, an application-programming interface (API), a library, and/or other computer-program product.

Figure 8:
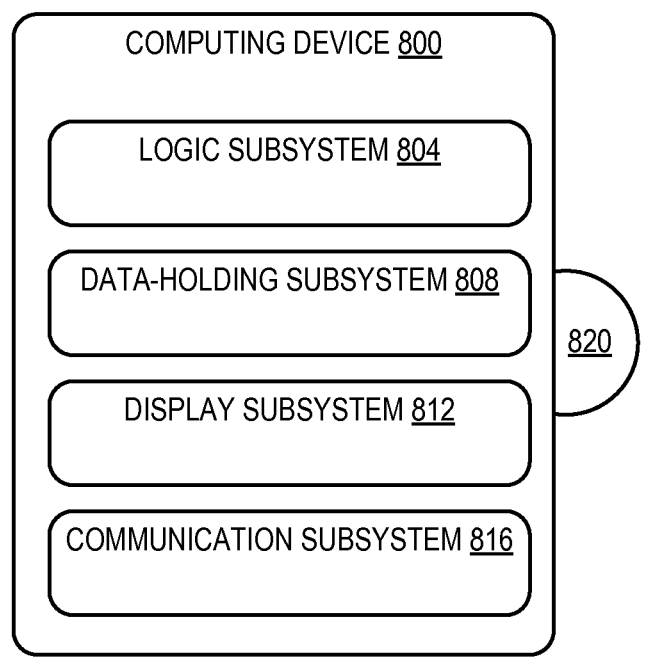
FIG. 8 is a simplified schematic illustration of an embodiment of a computing device.

FIG. 8 schematically shows a nonlimiting embodiment of a computing device 800 that may perform one or more of the above described methods and processes. Computing device 800 is shown in simplified form. It is to be understood that virtually any computer architecture may be used without departing from the scope of this disclosure. In different embodiments, computing device 800 may take the form of a mainframe computer, server computer, desktop computer, laptop computer, tablet computer, home entertainment computer, gaming console, set-top box (e.g. cable television box, satellite television box), network computing device, mobile computing device, mobile communication device, etc.

As shown in FIG. 8, computing device 800 includes a logic subsystem 804, a data-holding subsystem 808, a display subsystem 812, and a communication subsystem 816. Computing device 800 may optionally include other subsystems and components not shown in FIG. 8. Computing device 800 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 804 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 804 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 808 may include one or more physical, persistent devices configured to hold data and/or instructions executable by the logic subsystem 804 to implement the herein described methods and processes. When such methods and processes are implemented, the state of data-holding subsystem 808 may be transformed (e.g., to hold different data). Data-holding subsystem 808 may be configured to hold, for example, the video content 34.

Data-holding subsystem 808 may include removable media and/or built-in devices. Data-holding subsystem 808 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 808 may include devices with one or more of the following characteristics: volatile, nonvolatile, dynamic, static, read/write, read-only, random access, sequential access, location addressable, file addressable, and content addressable. In some embodiments, logic subsystem 804 and data-holding subsystem 808 may be integrated into one or more common devices, such as an application specific integrated circuit or a system on a chip.

FIG. 8 also shows an aspect of the data-holding subsystem 808 in the form of removable computer-readable storage media 820, which may be used to store and/or transfer data and/or instructions executable to implement the methods and processes described herein. Removable computer-readable storage media 820 may take the form of CDs, DVDs, HD-DVDs, Blu-Ray Discs, EEPROMs, and/or floppy disks, among others.

It is to be appreciated that data-holding subsystem 808 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 812 may be used to present a visual representation of data held by data-holding subsystem 808. As the above described methods and processes change the data held by the data-holding subsystem 808, and thus transform the state of the data-holding subsystem, the state of the display subsystem 812 may likewise be transformed to visually represent changes in the underlying data. For example, as the above described methods and processes identify scene boundaries in the video content 34, the display subsystem 812 may visually depict such scene boundaries in a visual representation of the video content. For example, the display subsystem 812 may depict representative frames from each scene in a browser bar panel, where a user can navigate to a particular scene by selecting the corresponding frame. The display subsystem 812 may include one or more display devices utilizing virtually any type of technology. Such display devices may be combined with logic subsystem 804 and/or data-holding subsystem 808 in a shared enclosure, or such display devices may be peripheral display devices.

Communication subsystem 816 may be configured to communicatively couple computing device 800 with one or more networks, such as network 42, and/or one or more other computing devices. Communication subsystem 816 may include wired and/or wireless communication devices compatible with one or more different communication protocols. As nonlimiting examples, the communication subsystem 816 may be configured for communication via a wireless telephone network, a wireless local area network, a wired local area network, a wireless wide area network, a wired wide area network, etc. In some embodiments, the communication subsystem may allow computing device 800 to send and/or receive messages to and/or from other devices via a network such as the Internet.

It will also be appreciated that in some examples the computing device 800 may operate in a cloud-based service that delivers video content to a client display device. In these examples the video content sent to the client display device may also include scene markers that denote one or more scenes that are detected using the above described systems and methods.

The above described systems and methods may be used in a computationally efficient manner to accurately identify scenes in video content, thereby addressing inefficiencies identified in the Background. As a result, viewers of video content may be provided with an enjoyable user experience in browsing the content and locating desired portions of the content.

The term "program" may be used to describe an aspect of the scene detection system 10 that is implemented to perform one or more particular functions. In some cases, such a program may be instantiated via logic subsystem 804 executing instructions held by data-holding subsystem 808. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for detecting a scene in video content, comprising:
   executed by a processor of a computing device,
      identifying a plurality of shots in the video content;
      selecting a target shot in the plurality of shots;
      building a forward window including the target shot and having a first number of the plurality of shots that are temporally ahead of the target shot;
      building a rearward window having a second number of the plurality of shots that are temporally behind the target shot;

for each of the shots in the forward window, determining a dissimilarity between a selected shot and each of the other shots in the rearward window;

if one or more of the determined dissimilarities is less than a scene boundary threshold, then determining that the scene does not begin at the target shot; and if none of the determined dissimilarities is less than the scene boundary threshold, then determining that the scene begins at the target shot.

2. The method of claim 1, wherein identifying a plurality of shots comprises identifying a gradual transition start frame in one or more of a plurality of frames in the video content, and further comprising:

if the target shot includes the gradual transition start frame, then determining that the scene begins at the target shot.

3. The method of claim 2, wherein identifying a gradual transition start frame further comprises:

for a target frame (i) in the plurality of frames, determining a cardinality of a first bin of a Y component color histogram of the target frame;

if the cardinality of the first bin is >0.98, then:

determining a number $GT_L$ of following frames that are temporally adjacent and forward of the target frame (i), where each of the following frames has a Y component color histogram with a first bin cardinality >0.98; and if a frame histogram similarity between a temporally adjacent previous frame (i−1) and a temporally forward frame (i+$GT_L$+1) is less than a false positive similarity threshold, then determining that the target frame (i) is the gradual transition start frame and setting a length of a gradual transition to $GT_L$.

4. The method of claim 2, wherein identifying a gradual transition start frame further comprises:

for a target frame (i) in the plurality of frames:

calculating a first set of frame histogram differences between the target frame (i) and each of X consecutive following frames ending in an end frame (i+X), where X is a positive integer;

calculating a second set of frame histogram differences between the end frame (i+X) and the target frame (i) and between the end frame (i+X) and each of the consecutive following frames between the target frame and the end frame (i+X);

if:

(a) the frame histogram differences in the first set are increasing towards the end frame (i+X), and (b) the frame histogram differences in the second set are decreasing towards the end frame (i+X), and (c) a false positive frame histogram difference between the target frame (i) and the end frame (i+X) is greater than a false positive difference threshold, and (a), (b) and (c) are true for Y of the consecutive following frames, where Y is a positive integer, then determining that the target frame (i) is the gradual transition start frame.

5. The method of claim 4, further comprising:

selecting a sample frame from among the target frame (i) and the X consecutive following frames; and if a blur value of the sample frame is greater than a blur value threshold, then determining that the target frame (i) is the gradual transition start frame.

6. The method of claim 1, wherein identifying a plurality of shots further comprises:

calculating a frame histogram similarity between a first frame and a temporally adjacent second frame of the video content; and using the frame histogram similarity to identify a hard cut transition between the first frame and the second frame.

7. The method of claim 1, wherein one shot of the first number of shots in the forward window is temporally adjacent to the target shot.

8. The method of claim 1, wherein the forward window and the rearward window have the same number of shots from the plurality of shots.

9. The method of claim 1, wherein determining a dissimilarity between a selected shot in the forward window and each of the other shots in the rearward window further comprises, for each of the shots in the forward window calculating a Euclidean distance between shot histograms of the selected shot in the forward window and each of the other shots in the rearward window.

10. The method of claim 1, further comprising:

calculating a frame histogram for each frame (i) in a plurality of frames in the video content;

using the frame histograms to identify a hard cut transition between a first frame and a temporally adjacent second frame (i) in the plurality of frames;

using the frame histograms to identify a gradual transition start frame (i) in the plurality of frames;

using the frame histograms to calculate shot histograms of each of the shots in the video content; and using the shot histograms to determine that the scene begins at the target shot.

11. A scene detection system for detecting a scene in video content, comprising:

a computing device including a processor and memory;

a scene detection program executed by the processor using portions of the memory, the scene detection program configured to:

identify a plurality of shots in the video content;

select a target shot in the plurality of shots;

build a forward window including the target shot and having a first number of shots that are temporally ahead of the target shot;

build a rearward window having a second number of shots that are temporally behind the target shot;

for each of the shots in the forward window determine a dissimilarity between a selected shot and each of the other shots in the rearward window;

if one or more of the determined dissimilarities is less than a scene boundary threshold, then determine that the scene does not begin at the target shot; and if none of the determined dissimilarities is less than the scene boundary threshold, then determine that the scene begins at the target shot.

12. The system of claim 11, wherein the scene detection program is further configured to:

identify a gradual transition start frame (i) in one or more of a plurality of frames in the video content, and if the target shot includes the gradual transition start frame, then determine that the scene begins at the target shot.

13. The system of claim 12, wherein the scene detection program is further configured to:

for a target frame (i) in the plurality of frames, determine a cardinality of a first bin of a Y component color histogram of the target frame;

if the cardinality of the first bin is >0.98, then:

determine a number $GT_L$ of following frames that are temporally adjacent and forward of the target frame (i), where each of the following frames has a Y component color histogram with a first bin cardinality >0.98; and if a frame histogram similarity between a temporally adjacent previous frame (i−1) and a temporally forward frame (i+$GT_L$+1) is less than a false positive similarity threshold, then determine that the target frame (i) is the gradual transition start frame and set a length of a gradual transition to $GT_L$.

14. The system of claim 12, wherein the scene detection program is further configured to:
for a target frame (i) in the plurality of frames:
calculate a first set of frame histogram differences between the target frame (i) and each of X consecutive following frames ending in an end frame (i+X), where X is a positive integer;
calculate a second set of frame histogram differences between the end frame (i+X) and the target frame (i) and between the end frame (i+X) and each of the consecutive following frames between the target frame and the end frame (i+X);
if:
(a) the frame histogram differences in the first set are increasing towards the end frame (i+X), and
(b) the frame histogram differences in the second set are decreasing towards the end frame (i+X), and
(c) a false positive frame histogram difference between the target frame (i) and the end frame (i+X) is greater than a false positive difference threshold, and
(a), (b) and (c) are true for Y of the consecutive following frames, where Y is a positive integer, then
determine that the target frame (i) is the gradual transition start frame.

15. The system of claim 14, wherein the scene detection program is further configured to:
select a sample frame from among the target frame (i) and the X consecutive following frames; and
if a blur value of the sample frame is greater than a blur value threshold, then determine that the target frame (i) is the gradual transition start frame.

16. The system of claim 11, wherein the scene detection program is further configured to:
calculate a frame histogram similarity between a first frame and a temporally adjacent second frame of the video content; and
use the frame histogram similarity to identify a hard cut transition between the first frame and the second frame.

17. The system of claim 11, wherein the scene detection program is further configured to determine a dissimilarity between the selected shot in the forward window and each of the other shots in the rearward window by calculating a Euclidean distance between shot histograms of the selected shot in forward window and each of the other shots in the rearward window.

18. The system of claim 11, wherein the scene detection program is further configured to:
calculate a frame histogram for each frame (i) in a plurality of frames in the video content;
use the frame histograms to identify a hard cut transition between a first frame and a temporally adjacent second frame (i) in the plurality of frames;
use the frame histograms to identify a gradual transition start frame (i) in the plurality of frames;
use the frame histograms to calculate shot histograms of each shot in the video content; and
use the shot histograms to determine that the scene begins at the target shot.

19. A method for detecting a scene in video content, comprising:
executed by a processor of a computing device,
analyzing each frame of a plurality of frames in the video content to identify a plurality of shots in the video content, wherein analyzing each frame of the plurality of frames comprises:
for a target frame (i) in the plurality of frames, determining a cardinality of a first bin of a Y component color histogram of the target frame;
if the cardinality of the first bin is >0.98, then:
determining a number $GT_L$ of following frames that are temporally adjacent and forward of the target frame (i), where each of the following frames has a Y component color histogram with a first bin cardinality >0.98; and
if a frame histogram similarity between a temporally adjacent previous frame (i−1) and a temporally forward frame (i+$GT_L$+1) is less than a false positive similarity threshold, then determining that the target frame (i) is a gradual transition start frame and setting a length of a gradual transition to $GT_L$;
selecting a target shot in the plurality of shots;
building a forward window including the target shot and having a first number of the plurality of shots that are temporally ahead of the target shot;
building a rearward window having a second number of shots that are temporally behind the target shot;
for each of the shots in the forward window, determining a dissimilarity between a selected shot and each of the other shots in the rearward window;
if one or more of the determined dissimilarities is less than a scene boundary threshold, then determining that the scene does not begin at the target shot; and
if none of the determined dissimilarities is less than the scene boundary threshold, then determining that the scene begins at the target shot.

20. The method of claim 19, further comprising:
for the target frame (i) in the plurality of frames:
calculating a first set of frame histogram differences between the target frame (i) and each of X consecutive following frames ending in an end frame (i+X), where X is a positive integer;
calculating a second set of frame histogram differences between the end frame (i+X) and the target frame (i) and between the end frame (i+X) and each of the consecutive following frames between the target frame and the end frame (i+X);
if:
(a) the frame histogram differences in the first set are increasing towards the end frame (i+X), and
(b) the frame histogram differences in the second set are decreasing towards the end frame (i+X), and
(c) a false positive frame histogram difference between the target frame (i) and the end frame (i+X) is greater than a false positive difference threshold, and
(a), (b) and (c) are true for Y of the consecutive following frames, where Y is a positive integer, then
determining that the target frame (i) is the gradual transition start frame.

* * * * *